United States Patent [19]

Anderson

[11] Patent Number: 4,986,515
[45] Date of Patent: Jan. 22, 1991

[54] WATER TABLE WITH WORK SUPPORTS

[76] Inventor: Harry E. Anderson, 307 Foxcroft Rd., Pittsburgh, Pa. 15220

[21] Appl. No.: 506,695

[22] Filed: Apr. 9, 1990

[51] Int. Cl.$^5$ .............................................. B23K 7/08
[52] U.S. Cl. .......................................... 266/49; 266/65
[58] Field of Search ........................ 266/48, 49, 60, 65

[56] References Cited

U.S. PATENT DOCUMENTS

| | | | |
|---|---|---|---|
| 4,345,744 | 8/1982 | Leibinger et al. | 266/49 |
| 4,358,091 | 11/1982 | Talanda | 266/49 |
| 4,524,955 | 6/1985 | Boardman | 266/65 |
| 4,887,797 | 12/1989 | Karow | 266/49 |

*Primary Examiner*—S. Kastler
*Attorney, Agent, or Firm*—Webb, Burden, Ziesenheim & Webb

[57] ABSTRACT

A water table with a work support arrangement for a metal workplate for use with a burning machine. The water table includes a water-holding tank, a frame positioned in the top of the tank, and a cutting gantry carrying a burning machine with is movable relative to the tank. First and second support gantries are mounted on opposite sides of the cutting gantry. Each support gantry carrries a movable plate support mechanism comprising a cantilever arm with an electromagnet for contacting the upper surface of a workplate. Intermediate plate support members for contacting the lower surface of a workplate positioned on the frame. The two plate support mechanisms may be moved to contact the upper surface of the workplate, and control means are provided for moving the plate support mechanisms relative to the cutting path of the burning machine.

20 Claims, 3 Drawing Sheets

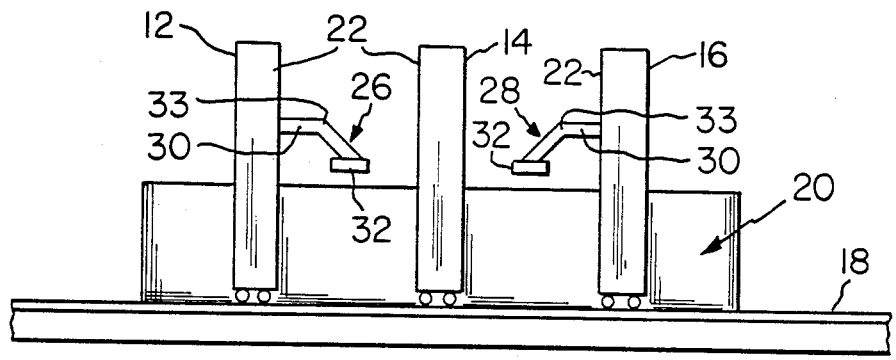
Fig. 1
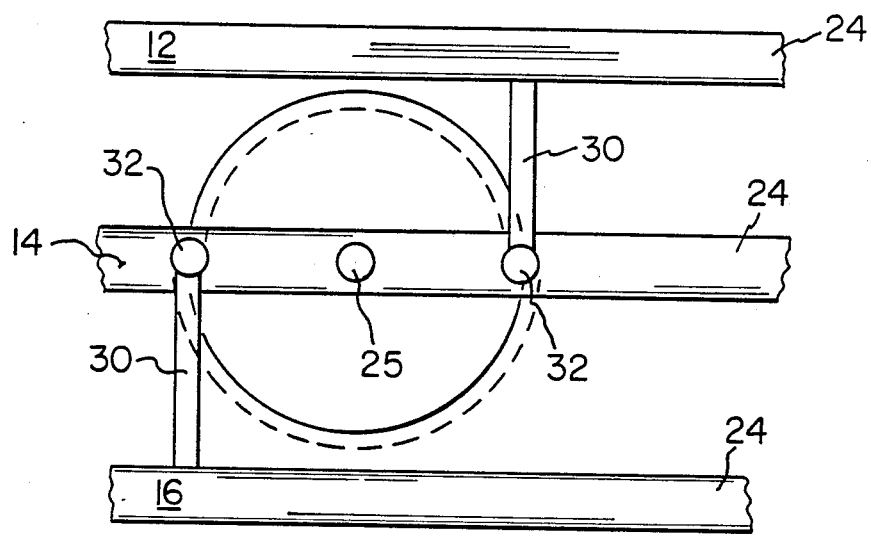
Fig. 2
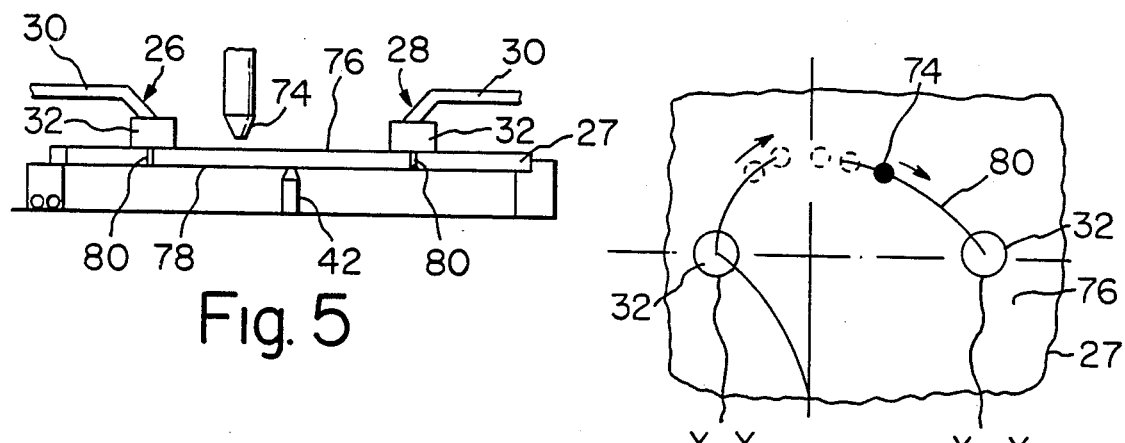
Fig. 5
Fig. 6

WATER TABLE WITH WORK SUPPORTS

BACKGROUND OF THE INVENTION

1. Field of the Invention

The present invention relates to water tables for use with burning or cutting machines and particularly to such water tables which include work supports which are movable relative to the burning machine and the work.

2. Description of the Prior Art

In burning machines, it is advantageous to maintain the part being cut from the metal workplate in the same plane as the workplate until complete separation is achieved. When the part and the workplate are completely separated, it is desirable to permit the part to drop from the workplate without the edges of the part tipping up and without tearing the part from the workplate. This avoids parts with jagged edges. The shapes of finished parts are infinitely random in size and configuration.

A water table is disclosed in U.S. Pat. No. 4,162,060. The water table has a plurality of frames positioned in an open top area, and the frames include several burning bars on which the metal workplate to be cut is supported. Alternative workplate supports are disclosed in U.S. Pat. No. 4,673,103. These workplate supports comprise equilateral pyramids which are individually distributed over a cutting surface at various points according to the general shape of the finished part to be cut from the workplate.

The prior art workplate supports are in certain circumstances found to be inadequate, particularly when it is desired to maintain the finished part in place until it is completely separated from the workplate by the burning machine and then drop the part. The prior art supports are inherently limited in their ability to conform to the particular size and shape of the finished part. The design of the prior art supports results in occasional tipping of the finished part when separated from the workplate due to uneven weight distribution over the supports. Additionally, uneven weight distribution may cause the edge of a finished part to prematurely tear from the workplate before complete separation of the part by the burning machine, thereby rendering the finished part unusable. This is particularly true when a large, thick part is cut.

In a standard burning machine, the movement of the cutting torch is determined by computer directed controls well known to those skilled in the art. The cutting torch is moved relative to the workplate and the water table in both the X and Y directions to create a cutting path which defines the shape of the finished part. The actual burning machine is usually carried on a cutting gantry and is located in a plane directly above the water table. In order to eliminate support problems inherent in the prior art, it has been found desirable to support the workplate by means which are coordinated with the movement of the burning machine and which include members which are suspended from gantries located above the workplate and retractable members located below the workplate. It is desirable to independently control these plate support members while at the same time having the capability to move them in relation to the movement of the burning machine.

Accordingly, it is an object of the present invention to provide a workplate support arrangement for use with a burning machine which may be positioned to provide optimum support from both above and below while a part is being cut from the workplate. A further object of the present invention is to provide means for simultaneously releasing the work support members from the finished part after cutting is completed to avoid undesirable tipping or tearing.

SUMMARY OF THE INVENTION

A water table with a work support arrangement for use with a burning machine includes an open top water tank and a frame having a bottom wall pivotally mounted in the open top of the tank. One or more intermediate plate support members are positioned on the bottom wall of the frame and extend upwardly to contact the lower surface of a metal workplate located above the frame. A cutting gantry is slidably mounted on rails which are located on opposite sides of the water table so that the cutting gantry straddles the water table. The cutting gantry carries a burning machine which is located in a plane directly above the water table.

A first support gantry is mounted on the same rails as the cutting gantry on one side of the cutting gantry and a second support gantry is mounted on the same rails as the cutting gantry on the opposite side of the cutting gantry. A first plate support mechanism is adjustably mounted on the first support gantry and a second plate support mechanism is adjustably mounted on the second support gantry. The first and second plate support mechanisms are capable of lateral movement along their respective gantries in a plane directly above the water table. These mechanisms include a cantilever arm having an end pivotally mounted at the support gantry and a distal end carrying a contact head which is positioned by the cantilever arm so as to contact the upper surface of the metal workplate and a part being cut therefrom. Each contact head includes an electromagnet.

Control means are provided for positioning the plate support mechanisms in coordination with one another and with the cutting torch of the burning machine to contact the metal workplate at preselected locations with respect to a cutting path created in the metal workplate by the cutting torch of the burning machine.

Intermediate plate support members located below the workplate may comprise fixed posts extending upwardly from the bottom wall of the frame to contact the lower surface of a metal workplate positioned above the frame. Alternatively, each intermediate plate support member may comprise a post reciprocally mounted within a sleeve so that the post can be moved relative to the sleeve by either pneumatic or hydraulic means.

The plate support mechanisms and the intermediate plate support members are controlled by a programmable computer.

The frame may include other features such as a grounding pad support fixed to the bottom wall adjacent an end of the frame upon which an edge of the metal workplate is placed. A grounding pad may be affixed to a top portion of the grounding pad support, and electrical connections join the pad with a grounding bus bar mounted on a wall of the tank for electrically grounding the metal workplate. A workplate edge support member upon which an opposite edge of the metal workplate is placed may be slidably mounted on the frame. The workplate edge support member may be adjusted on the frame for different workplate dimensions.

One or more squaring stops may be mounted adjacent an outside edge of the grounding pad support structure for positioning the metal workplate on the frame. These squaring stops may be fixed or pivotally mounted.

The present invention is further described hereinafter in connection with the accompanying drawings wherein like reference numerals identify like parts.

BRIEF DESCRIPTION OF THE DRAWINGS

FIG. 1 is a schematic side elevation of a water table according to the invention;

FIG. 2 is a cut away schematic plan view of the work support arrangement and burning machine;

FIG. 5 is an elevation showing first, second and intermediate plate support members and a burning machine positioned relative to a workplate;

FIG. 6 is a schematic view showing placement of the contact members with respect to a cutting path in a workplate;

DETAILED DESCRIPTION OF THE PREFERRED EMBODIMENT

Figure 3:
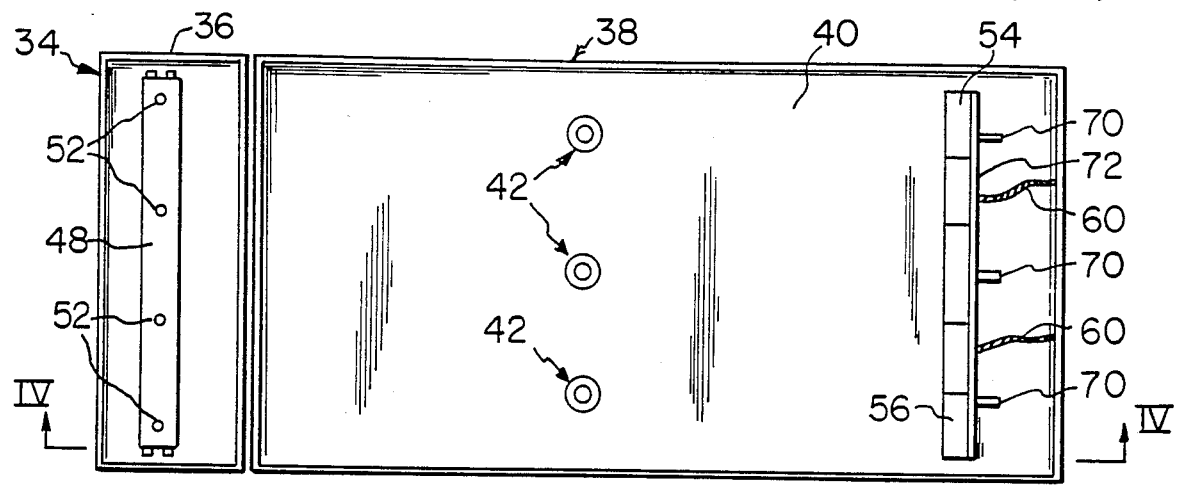
FIG. 3 is a schematic plan view of a frame having a movable edge support, three intermediate plate support members and a grounding pad.

FIG. 1 of the drawings shows a water table 20 with a work support arrangement according to the invention. Three gantries 12, 14 and 16 are mounted on rails 18 on opposite sides of the water table for movement in a first direction parallel to the longitudinal axis of water table 20. The gantry 14 is the cutting gantry and is located on the rails 18 between a first support gantry 12 and a second support gantry 16. Each gantry consists of spaced upright members 22 and a crossbar 24 connecting the upper ends of members 22 so that the gantry straddles water table 20. While only one upright member 22 is shown for each gantry in FIG. 1, the corresponding upright member is mounted on the rail 18 (not shown) on the opposite side of the water table.

The cutting gantry 14 carries a standard burning machine 25 on crossbar 24. The burning machine forms no part of the invention and may be one of various designs well known to those skilled in the art, such as the L-Tec Models CM-100 and CM-350 available from L-Tec Welding and Cutting Systems, Inc., of Florence, S.C. The burning machine 25 is generally mounted on crossbar 24 for movement perpendicular to the direction of movement of gantry 14 along rails 18.

The first support gantry 12 carries a first plate support mechanism 26 which is adjustably mounted on crossbar 24. The second support gantry 16 carries a second plate support mechanism 28 adjustably mounted on crossbar 24. The plate support mechanisms 26 and 28 are oriented to face the cutting gantry 14 located between gantries 12 and 16. Consequently, the first plate support mechanism 26, the second plate support mechanism 28 and the burning machine 25 may simultaneously function relative to a metal workplate 27 positioned on water table 20 as discussed in detail hereinafter.

FIG. 2 of the drawings shows the relative motion of the first and second plate support mechanisms 26 and 28 and the burning machine 25. As stated, gantries 12, 14 and 16 are mounted on rails 18 for movement in a first direction while the burning machine 25 and the plate support mechanisms 26 and 28 may move along the crossbars 24 on the gantries in a second direction perpendicular to the first direction. This capability to move in the second direction gives burning machine 25 and the plate support mechanisms 26 and 28 a 180° area of operation with respect to the workplate.

Each plate support mechanism 26 and 28 includes a cantilever arm 30 which has one end pivotally mounted to a support gantry and a contact head 32 is mounted on the distal end. Each cantilever arm 30 may further include one or more articulated joints 33 for enhanced maneuverability of the contact head. The cantilever arms 30 lower the contact heads 32 to the plane including the upper surface of the metal workplate 27. Each contact head 32 includes an electromagnet for supporting pieces of metal when energized. Means for energizing the electromagnet without inhibiting movement of either support gantries 12 and 16 or plate support mechanisms 26 and 28 are well known to those skilled in the art.

Figure 4:
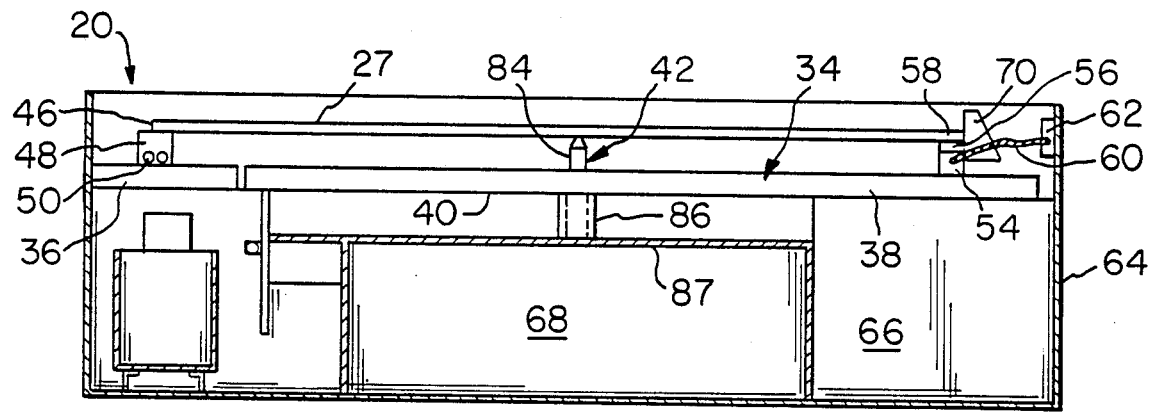
FIG. 4 is a section on line IV—IV of FIG. 3 with a workplate in place above the frame.

FIG. 3 of the drawings shows a frame 34 having an access portion 36 and a pivot portion 38. The frame is mounted in the open top of water table 20 as shown in FIG. 4. Details regarding the mounting of frame 34 on water table 20 are disclosed in U.S. Pat. No. 4,162,060 which is incorporated herein by reference. The frame 20 as disclosed in the '060 patent is suitable for use with the present invention when the burning bars are eliminated. In the present invention, the frame 34 has a bottom wall 40 upon which a plurality of intermediate plate support members 42 are mounted. The intermediate plate support members 42 are shown in FIG. 3 as located along a lateral axis of the bottom wall 40 to provide support to the middle portion of a metal workplate 27 but the number and location of the supports may vary. A first edge 46 of workplate 27 is supported by a movable plate edge support 48 mounted on the access portion 36 of the frame 34. The movable plate edge support 48 is supported on the frame by a plurality of rollers 50 to adjust the plate edge support 48 to accommodate different workplate dimensions. The frame 34 may also include means for locking the plate edge support 48 in place, including a pin and slot arrangement 51 shown schematically in FIG. 7 of the drawings. Finally, the movable plate edge support 48 may carry a plurality of replaceable point supports 52 which may be designed in accordance with U.S. Pat. No. 4,673,103 which is incorporated herein by reference.

A grounding pad support 54 is mounted on the bottom wall 40 at the end of frame 34 opposite the access portion 36. A grounding pad 56 is affixed to the top portion of the grounding pad support 54, and a second edge 58 of workplate 27 is rested thereon. One or more cables 60 electrically connect grounding pad 56 with a grounding bus bar 62 mounted on a wall 64 which is part of the tank 66 of water table 20. The tank 66 is designed to hold water, and the level of water in the tank is adjusted by pumping air into the air chamber 68 as is further described in the '060 patent. The grounding pad 56 and the grounding bus bar 62 provide electrical grounding of the metal workplate 27 when cutting is carried out by electric arc burning or a similar method.

A plurality of squaring stops 70 may be mounted adjacent the outside edge 72 of the grounding pad 56 for further support of the second edge 58 of workplate 27.

The squaring stops 70 facilitate correct alignment of the metal workplate 27 above the frame 34 for burning operations. Squaring stops 70 may be fixed in the upright position or they may be pivotally mounted. The squaring stops 70 may be retractable by pneumatic or hydraulic means well known to those skilled in the art.

The water table with the work support arrangement also includes a programmable computer (not shown) for controlling the operation of support mechanisms 26 and 28 and support members 42. FIG. 5 of the drawings shows the plate support mechanisms 26 and 28 in place on the metal workplate 27 while a cutting torch 74 of burning machine 25 is in operation. The contact heads 32 of the first plate support mechanism 26 and the second plate support mechanism 28 contact the upper surface 76 of the metal workplate 27 according to a location ($X_1$, $Y_1$) along a cutting path 80 (FIG. 6) preprogrammed in the computer. The plate support members 42 contact the lower surface 78 of the workplate. The contact heads 32 will be placed onto the upper surface 76 of the metal workplate by the cantilever arms 30 to straddle the cutting path 80 which has been made in the metal workplate 27 by cutting torch 74.

The straddling positions of the contact heads 32 on the cutting path assures that a finished part 82 is held in the same plane as the metal workplate 27 while the cutting torch 74 completes the cutting operation. FIG. 6 of the drawings schematically shows the placement of contact heads 32 with respect to the cutting path 80 of cutting torch 74.

Figure 9:
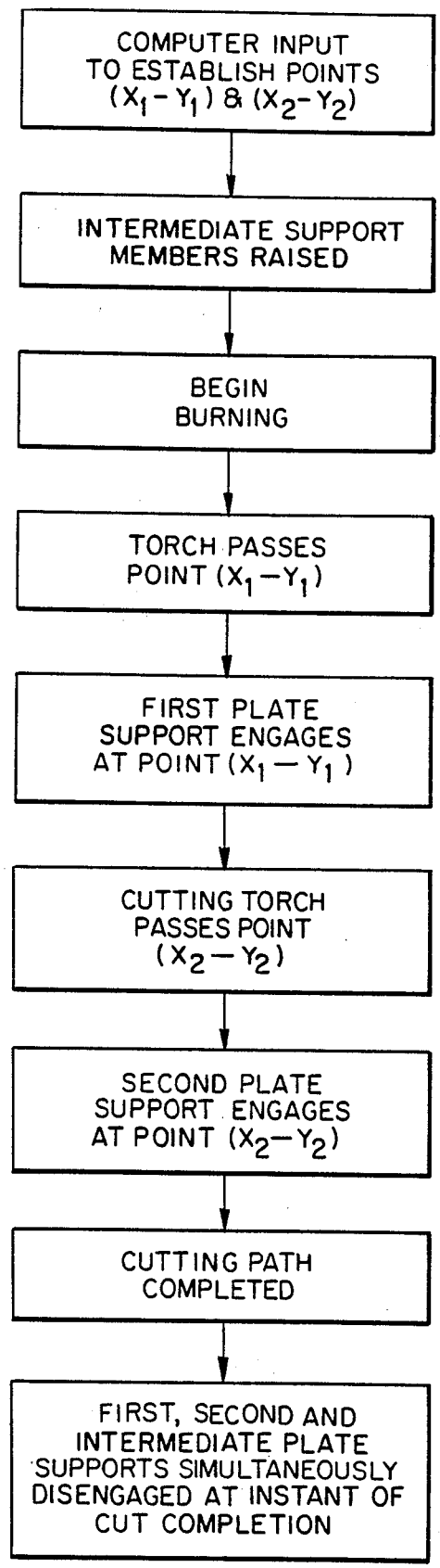
FIG. 9 is a flowchart showing a cutting cycle.

The operation of the water table with the work support arrangement is shown in FIG. 9 of the drawings. The user first inputs the coordinates of the cutting path 80 into the computer to control the movement of the burning machine 25. Next, the user chooses two points on the upper surface 76 along the cutting path 80 to provide support for the finished part 82 while the workplate is still being cut by the cutting torch 74. The only limitation on the location of these two points is that each plate support mechanism has a 180° area of movement with respect to a central axis along the crossbar 24 of the cutting gantry 14, as discussed above. These points, ($X_1$, $Y_1$) and ($X_2$, $Y_2$), are inputted to the computer as the locations where the contact heads 32 are to be placed on the upper surface of the metal workplate 27 by the plate support mechanisms 26 and 28. The intermediate support members are raised and burning machine 25 is activated to begin cutting.

Figure 8:
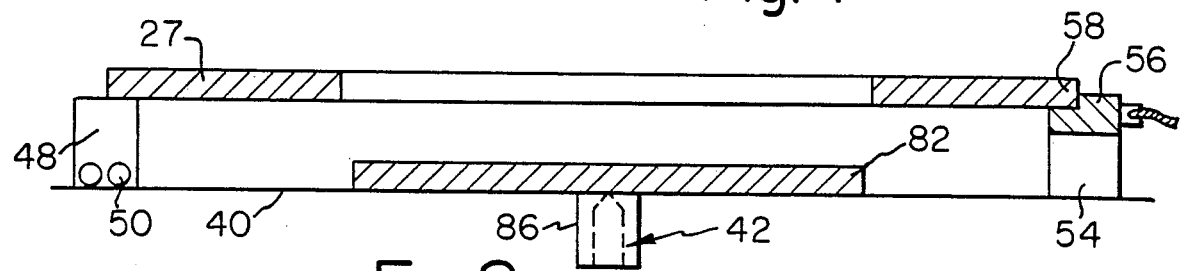
FIG. 8 is an elevation showing a finished part separated from the workplate of FIG. 7.

When the cutting torch 74 passes point $X_1$, $Y_1$ along the cutting path 80, the computer is signaled and the first plate support mechanism 26 is maneuvered to place a contact head 32 onto the upper surface of the metal workplate 27 at point $X_1$, $Y_1$. The cutting torch continues along the cutting path 80 until it passes point $X_2$, $Y_2$, at which time the computer is again signaled and the second plate support mechanism 28 is positioned to place a second contact head 32 onto the upper surface of the metal workplate 27 at point $X_2$, $Y_2$. When the cutting path 80 is completed and a finished part 82 is fully severed from the workplate, the computer is again signaled and the first and second mechanisms 26 and 28 and intermediate plate support members 42 are simultaneously released. Specifically, contact heads 32 are de-energized and the intermediate plate support members 42 are retracted so that the finished part 82 falls from the metal workplate 27 onto the bottom wall 40 as shown in FIG. 8 of the drawings.

Figure 7:
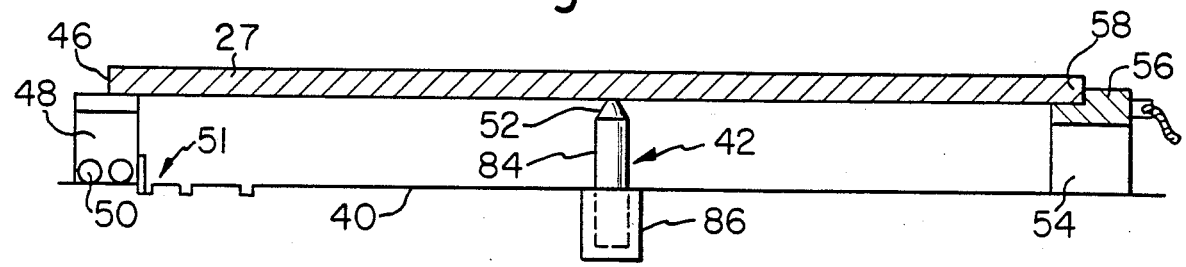
FIG. 7 is an elevation showing a workplate supported above the frame.

The intermediate plate support 42 is shown in FIG. 7 with a point support 52 on a post 84. Without this support on the lower surface 78 of the metal workplate 27, the center of the metal workplate would tend to sag of its own weight, particularly in the case of large, thick plates. In some circumstances, the design of the cutting path 80 will cause the burning machine to move cutting torch 74 directly over a post 84 with a resultant risk of damaging the post. If, as in the preferred embodiment, more than one intermediate plate support members 42 are located on the bottom wall 40, the post 84 may be retracted at the appropriate time to avoid damage thereto, with the remaining intermediate plate support members supporting the metal workplate 27. It will be appreciated that there are various methods for retracting the posts including both pneumatic and hydraulic means. As shown in FIG. 4, each post 84 may be mounted in a sleeve 86 which extends below the bottom wall 40 and provides for nesting of the post 84 inside the sleeve 86. The sleeve 86 rests on a top wall 87 of air chamber 68. The key feature of intermediate plate support members 42 is that posts 84 may be retracted from the fully extended position to become flush with the bottom wall 40.

FIG. 7 of the drawings shows the workplate 27 in place on plate edge support 48, an intermediate plate support member 42 and grounding pad 56 before commencement of cutting. The intermediate plate support member 42 is in its fully extended position. FIG. 8 shows the finished part 82 after it has been cut from the workplate 27 resting on the bottom wall 40. The post 84 has at this point been retracted to become flush with the bottom wall 40.

As discussed, the computer is programmed to retract posts 84 simultaneously with release of contact heads 32 from the upper surface 76 of the metal workplate 27 after the cutting torch 74 has completed cutting path 80. Simultaneous release of the plate support mechanisms and retraction of the intermediate plate support members are important because the finished part 82 is permitted to fall free from the workplate onto the bottom wall 40 of frame 34. Premature release of intermediate plate supports 42 may cause sagging of the workplate 27 and distortion of the cutting path 80. On the other hand, delayed retraction of posts 84 until after release of contact heads 32 may leave the finished part 82 teetering on point supports 52 and tipping unevenly onto the bottom wall 40 thereby damaging the edge of the finished part 82.

In order to fully automate the apparatus, a computer is connected to gantry 14 and cutting machine 25; to support gantries 12 and 16; to intermediate plate supports 42 and to the valve which controls the water level in tank 66 of the table. The sequence of operation which is programmed in the computer is as follows:

1. Intermediate support members 42 are raised for the loading of the workplate on the cutting table when the water in tank 66 is low.
2. The water level is raised in tank 66 and movement of cutting torch 25 and cutting gantry 14 is initiated.
3. As cutting torch 25 is following cutting path 80 on the workplate it approaches the position of an intermediate plate support member 42 and the plate support member 42 is retracted and a support gantry is moved from the park position to a position wherein the contact head 32 can be lowered to contact both the part and the workplate to support them in the same plane.

4. As cutting torch 25 passes along the cutting path adjacent to the other support gantry at the opposite end of the workplate that gantry moves from the park position to a position wherein the contact head 32 can be lowered to contact both the part and the workplate to support them in the same plane.

5. The cutting torch 25 signals the computer when the cutting path is completed and the computer releases magnetic heads 32 and retracts lower plate support members 42 so that the part drops onto the bottom wall 40 of the table.

6. Upon completion of the cutting cycle, the computer returns the cutting gantry and the support gantries to, their respective park positions.

According to the above sequence of operations, the part is fully supported throughout the cutting cycle without any opportunity to tip or to tear at the edge during cutting.

The present invention provides support for a finished part while it is being cut from a metal workplate, and the computer provides for precise control of the support arrangement in relation to the cutting action of the burning machine. Desirable simultaneous release of all plate supports is facilitated by programming the computer to do so. Thus, both efficiency of cutting and quality of the finished parts are enhanced by the execution of two major steps for successful operation: (1) placement of the metal workplate on the frame; and (2) programming the computer. The result is that a finished part is held in the same plane as the workplate to avoid tearing, and the finished part is cleanly separated from the workplate without tipping.

Having described presently a preferred embodiment of the invention, it is to be understood that it may otherwise be embodied within the scope of the appended claims.

I claim:

1. A water table with a work support arrangement for use with a burning machine comprising:
a tank for holding water having a plurality of sidewalls, a bottom and an open top;
a frame mounted in said open top of said tank, said frame having a bottom wall and means for supporting a metal workplate;
one or more means for supporting a metal workplate positioned on the bottom wall of said frame and extending upwardly to contact the lower surface of a workplate located on said frame;
a cutting gantry mounted on rails located on opposite sides of said tank for movement in a first direction relative to said frame, said cutting gantry adapted to slidably carry a burning machine for movement in a second direction relative to said first direction;
a first support gantry mounted on said rails on one side of said cutting gantry;
a second support gantry mounted on said rails on the opposite side of said cutting gantry;
plate support means mounted on each of said first and second support gantries: for slidable movement relative to said frame in said second direction;
said plate support means on said support gantries having a cantilever arm pivotally mounted at one end to said support gantry and a contact head mounted on the distal end of said cantilever arm, whereby each of said contact heads is adjustable to contact the upper surface of a metal plate by pivoting said cantilever arm; and
control means for adjusting said means for contacting the upper and lower surfaces of a workplate at preselected locations with respect to a cutting path created by a burning machine when said workplate is positioned on said frame.

2. A water table as set forth in claim 1 wherein said means for supporting a plate positioned on the bottom wall of said frame comprises one or more posts extending upwardly from the bottom wall of said frame.

3. A water table as set forth in claim 2 wherein each of said one or more posts is adapted to retract from a fully extended upward position to a position flush with said bottom wall of said frame.

4. A water table as set forth in claim 3 wherein each of said one or more posts is slidably mounted in a sleeve, said posts being adapted to retract from the fully extended upward positions to concentrically nest within said sleeves to become flush with said bottom wall of said frame.

5. A water table as set forth in claim 1 wherein each of said contact heads is an electromagnet pivotally mounted to said distal end of said cantilever arm.

6. A water table as set forth in claim wherein each of said plate support means has 180° of movement with respect to a longitudinal axis along the cutting gantry.

7. A water table as set forth in claim 1 including a plate edge support mounted on said frame for supporting an edge of a workplate above said frame, said plate edge support being adjustable relative to said frame to receive different size workplates.

8. A water table as set forth in claim including a grounding pad mounted at an end of said frame for supporting an edge of a workplate above said frame.

9. A water table as set forth in claim 8 including a grounding bus bar mounted on a wall of said tank and means electrically connecting said grounding pad with said grounding bus bar.

10. A water table as set forth in claim 8 including one or more squaring stops mounted adjacent an outer edge of said grounding pad for positioning a workplate above said frame.

11. A water table as set forth in claim 10 wherein said squaring stops are pivotally mounted on said grounding pad.

12. A water table as set forth in claim wherein said control means includes a computer which may be programmed to move said plate support means to locations on both the upper and lower surfaces of a workplate, said locations being preselected with respect to the cutting path created by a burning machine, said computer also being programmable to simultaneously release said plate support means whereby a finished part falls free from the workplate.

13. A water table with a work support arrangement for use with a burning machine comprising:
a tank having a bottom, a plurality of sidewalls and an open top for holding water;
a frame having a bottom wall mounted in said open top of said tank, said frame having means for supporting a metal workplate;
one or more intermediate plate support means positioned on the bottom wall of said frame and extending upwardly to contact the lower surface of a workplate supported above said frame;
said intermediate plate support means comprising one or more posts mounted on said bottom wall of said frame, each of said posts being retractable from its fully extended upper position to a lower position;

a cutting gantry movably mounted relative to said tank for travel in a first direction, a burning machine movably supported on said cutting gantry for travel in a second direction substantially perpendicular to said first direction;

a first support gantry located on one side of said cutting gantry;

a second support gantry located on the opposite side of said cutting gantry;

plate support means mounted on each of said first and second support gantries for slidable movement in a plane above a metal plate in said second direction;

each plate support means comprising a cantilever arm having one end pivotally mounted to a support gantry;

a contact head mounted to the distal end of each cantilever arm, said contact head being adjustable by said cantilever arm to contact the upper surface of a workplate;

each contact head including an electromagnet; and control means for adjusting said plate support means to independently contact the upper surface and the lower surface of a workplate at preselected locations with respect to a cutting path created by a burning machine when said workplate is positioned above said frame.

14. A water table as set forth in claim 13 wherein each of said posts is slidably mounted in a sleeve and said posts are adapted to retract from the fully extended upward position to concentrically nest within said sleeve.

15. A water table as set forth in claim 13 including movable workplate edge support means mounted on said frame for supporting an edge of a workplate, said workplate edge support means being adjustable to accommodate workplates having different dimensions.

16. A water table as set forth in claim 13 including a grounding pad fixedly mounted at an end of said frame for supporting an edge of a metal workplate, a grounding bus bar mounted on a wall of said tank and means electrically connecting said grounding pad with said bus bar.

17. A water table as set forth in claim 16 including at least one squaring stop mounted adjacent an outer edge of said grounding pad for positioning a workplate above said frame.

18. A water table as set forth in claim 13 wherein said control means includes a computer which may be programmed to move said plate support means to locations on the upper and lower surfaces of a workplate, said locations being preselected with respect to the cutting path of a burning machine, said computer also being programmable to simultaneously release said plate support means to allow a finished part to fall free from a workplate.

19. A water table with a work support arrangement for use with a burning machine comprising:

a tank having a bottom, sidewalls and an open top for holding water;

a frame having a bottom wall mounted in said open top of said tank;

one or more intermediate plate support means positioned on said bottom wall of said frame for supporting a metal plate above said frame, each of said intermediate plate support means comprising a sleeve which houses a concentric reciprocating post, each post being retractable within a sleeve;

a cutting gantry movably mounted on opposite sides of said tank for travel in a first direction, a burning machine movably mounted on said cutting gantry for travel in a second direction substantially perpendicular to said first direction;

a first support gantry positioned on one side of said cutting gantry;

a second support gantry positioned on the opposite side of said cutting gantry;

plate support means slidably mounted on each of said support gantries for slidable movement in said second direction, each of said plate support means comprising a cantilever arm having one end mounted on a support gantry and a contact head pivotally mounted on the distal end;

said contact head comprising an electromagnet;

control means for moving said plate support means to independently contact the upper surface and the lower surface of a workplate at preselected locations with respect to a cutting path of a burning machine on a workplate positioned on said frame;

said control means including a computer programmed to move said plate support means into locations on the upper and lower surfaces of the workplate, said locations being preselected with respect to the cutting path of the burning machine, said computer further being programmable to simultaneously release said work support means to allow a finished part to fall free from a workplate;

a grounding pad positioned at an end of said frame for supporting an edge of a plate and for providing electrical grounding thereof;

means electrically connecting said grounding pad with a grounding bus bar mounted on a wall of said tank; and a movable plate edge support mounted at the opposite end of said frame for providing support to an edge of a metal plate.

20. A water table having a work support arrangement and a burning machine, said water table comprising:

an open top tank having a bottom and a plurality of walls for holding water;

a frame having a bottom wall mounted in said open top of said tank;

a movable cutting gantry mounted for travel in a first direction relative to said tank, said cutting gantry adapted to slidably carry said burning machine in a plane above a workplate for travel in a second direction relative to said first direction;

a first support gantry positioned on one side of said cutting gantry;

a second support gantry positioned on the opposite side of said cutting gantry;

support means mounted on each support gantry for slidable movement in said second direction in a plane above a metal workplate;

each of said support means having a cantilever arm with one end pivotally mounted to a support gantry and a contact head mounted on the distal end whereby each of said contact heads is movable by said cantilever arm to contact the upper surface of a metal workplate; and control means for moving said support means to independently contact the upper surface of a workplate at preselected locations with respect to a cutting path created by said burning machine on the workplate when said workplate is positioned on said frame.

* * * * *

UNITED STATES PATENT AND TRADEMARK OFFICE
CERTIFICATE OF CORRECTION

PATENT NO. : 4,986,515

DATED : January 22, 1991

INVENTOR(S) : Harry E. Anderson

It is certified that error appears in the above-identified patent and that said Letters Patent is hereby corrected as shown below:

ON TITLE PAGE:

Under References Cited U.S. PATENT DOCUMENTS insert
--4,162,060 7/1979 Anderson, et al. ... 266/49
4,673,103 6/1987 Anderson, et al. ... 221/186
4,570,907 2/1986 Anderson, et al. ... 266/69--.

Column 2 Line 49 "reciprocally" should read --reciprocably--.

Column 2 Line 54 "support:" should read --support--.

Column 3 Line 58 "support:" should read --support--.

Claim 1 Line 62 Column 7 "gantries:" should read --gantries--.

Claim 6 Line 25 Column 8 after "claim" insert --1--.

Claim 8 Line 33 Column 8 after "claim" insert --1--.

Claim 12 Line 47 Column 8 after "claim" insert --1--.

Signed and Sealed this

Seventh Day of July, 1992

*Attest:*

DOUGLAS B. COMER

*Attesting Officer*     *Acting Commissioner of Patents and Trademarks*